US008715862B2

(12) United States Patent
Hwang et al.

(10) Patent No.: US 8,715,862 B2
(45) Date of Patent: May 6, 2014

(54) NEGATIVE ELECTRODE ACTIVE MATERIAL, NEGATIVE ELECTRODE HAVING THE SAME AND LITHIUM SECONDARY BATTERY

(75) Inventors: Cheol-Hee Hwang, Suwon-si (KR); Bong-Chull Kim, Suwon-si (KR); Jong-Chan Kim, Suwon-si (KR); Se-Ho Park, Suwon-si (KR); Na-Rae Won, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1272 days.

(21) Appl. No.: 12/471,241

(22) Filed: May 22, 2009

(65) Prior Publication Data
US 2009/0297945 A1 Dec. 3, 2009

(30) Foreign Application Priority Data
May 29, 2008 (KR) ........................ 10-2008-0050189

(51) Int. Cl.
*H01M 2/16* (2006.01)
(52) U.S. Cl.
USPC ........... 429/247; 429/209; 429/217; 429/222; 429/225; 429/233; 429/252; 429/253; 429/254; 429/231.8
(58) Field of Classification Search
USPC .............. 429/207, 212, 213, 216, 218.1, 222, 429/225, 226, 229, 231.6, 231.8, 232, 251, 429/252
See application file for complete search history.

(56) References Cited

U.S. PATENT DOCUMENTS

| 7,785,498 | B2 * | 8/2010 | Jang et al. ...................... 252/513 |
|---|---|---|---|
| 2002/0009646 | A1 | 1/2002 | Matsubara et al. |
| 2005/0136330 | A1 | 6/2005 | Mao et al. |
| 2006/0040182 | A1 * | 2/2006 | Kawakami et al. ......... 429/218.1 |
| 2006/0216606 | A1 * | 9/2006 | Kim et al. ...................... 429/232 |
| 2007/0054190 | A1 * | 3/2007 | Fukui et al. ................. 429/218.1 |
| 2008/0131772 | A1 * | 6/2008 | Jambunathan et al. ........ 429/199 |
| 2008/0226984 | A1 * | 9/2008 | Lee et al. ....................... 429/207 |
| 2010/0129699 | A1 * | 5/2010 | Mikhaylik et al. .............. 429/50 |

FOREIGN PATENT DOCUMENTS

| JP | 2003-012311 | 1/2003 |
|---|---|---|
| JP | 2006-286314 | 10/2006 |
| JP | 2007-095494 | 4/2007 |
| JP | 2007-123242 | 5/2007 |
| KR | 2001-0113448 | 12/2001 |
| KR | 10-2006-0069738 | 6/2006 |

(Continued)

OTHER PUBLICATIONS

KIPO Notice of Allowance dated Jan. 3, 2011, for Korean priority Patent application 10-2008-0050189, noting listed references in this IDS.

(Continued)

*Primary Examiner* — Melissa Stalder
(74) *Attorney, Agent, or Firm* — Christie, Parker & Hale, LLP

(57) ABSTRACT

A lithium secondary battery includes a positive electrode having a positive electrode active material, a negative electrode having a negative electrode active material, a separator separating the positive electrode from the negative electrode, and an electrolyte. The negative electrode active material includes a graphite core particle, at least one metal particle located on the graphite core particle, and a polymer film coating the graphite core particle and the at least one metal particle. The polymer includes a polyimide- or polyacrylate-based polymer.

17 Claims, 2 Drawing Sheets

(56) References Cited

FOREIGN PATENT DOCUMENTS

| | | |
|---|---|---|
| KR | 10-2006-0087003 | 8/2006 |
| KR | 10-2006-0111588 | 10/2006 |
| WO | WO/2008/070059 A2 * | 6/2008 |

OTHER PUBLICATIONS

Patent Abstracts of Japan, and English machine translation of Japanese Publication 2003-012311, listed above, 29 pages.
Patent Abstracts of Japan, and English machine translation of Japanese Publication 2007-095494, listed above, 30 pages.

* cited by examiner

NEGATIVE ELECTRODE ACTIVE MATERIAL, NEGATIVE ELECTRODE HAVING THE SAME AND LITHIUM SECONDARY BATTERY

CROSS-REFERENCE TO RELATED APPLICATION

This application claims prior to and the benefit of Korean Patent Application No. 2008-50189, filed in the Korean Intellectual Property Office on May 29, 2008, the content of which is hereby incorporated in its entirety by reference.

BACKGROUND OF THE INVENTION

1. Field of the Invention

The present invention relates to a negative electrode active material, a negative electrode, and a lithium secondary battery having the same.

2. Description of the Related Art

Lithium metal has been used as negative electrode active materials. However, because of potential dangers of short circuits and explosion due to the formation of dendrites associated with the use of lithium metals, carbon materials are more commonly used as the negative electrode active material.

The carbon materials used in negative electrode active materials for lithium batteries typically include crystalline carbon, such as graphite and artificial graphite, and amorphous carbon, such as soft carbon and hard carbon.

The amorphous carbon has high capacity, but it also high irreversibility during the charge-discharge cycle. Similarly, the crystalline carbon, such as graphite, has high theoretical capacity (i.e. 372 mAh/g), but it still has problems with short life-span.

In addition, neither the graphite nor carbon active materials can be used as negative electrodes since their current theoretical capacity (approximately 380 mAh/g) is not sufficiently high enough to be used in high capacity lithium batteries.

To address to these problems, metal composite negative electrode active materials, such as aluminum (Al), germanium (Ge), silicon (Si), tin (Sn), zinc (Zn) and lead (Pb), are being studied as alternative materials for use in lithium batteries.

However, inorganic or metal particles such as Si or Sn, which are included in the negative electrode active material, can cause volume expansion by as much as 300 to 400% when the particles are exposed to the intercalation of lithium ions.

As lithium ions are deintercalated during the discharging cycle, the inorganic particles contract thereby causing the negative electrode active material to degrade. The problem is further exacerbated by the repeated charge-discharge cycles.

Even further, the inorganic particles may become detached when the negative electrode active materials degrade, which can cause side reactions with the electrolyte to occur and reduce the battery's cycle and high rate discharge characteristics.

SUMMARY OF THE INVENTION

Aspects of various embodiments of the present invention provide a metal composite negative electrode active material having improved cycle life and high rate discharge characteristics by suppressing volume expansion of the metal particles, a negative electrode, and a lithium secondary battery having the same.

In one embodiment, the negative electrode active material includes a graphite core particle, at least one metal particle located on the graphite core particle, and a film coating the graphite core particle and the metal particle(s). In one embodiment, the film is a film of polymer.

In another exemplary embodiment, the negative electrode includes a negative electrode collector and a negative electrode active material having a graphite core particle and at least one metal particle located on the graphite core particle. In the exemplary embodiment, the negative electrode active material includes a polymer film that coats the graphite core particle and the metal particle(s).

In yet another embodiment, the lithium secondary battery includes a positive electrode having a positive electrode active material, a negative electrode having a negative electrode active material, a separator separating the positive electrode from the negative electrode, and an electrolyte. The negative electrode active material may include a graphite core particle, at least one metal particle located on the graphite core particle, and a film of polymer that coats the graphite core particle and the metal particle(s).

In one embodiment, the polymer film is a polymerization reaction product of a base polymer. The base polymer may include a polyimide- or polyacrylate-based polymer.

In one embodiment, the polyacrylate-based polymer is selected from the group consisting of polymethylmethacrylate (PMMA), polyethylmethacrylate (PEMA), polybutyl methacrylate (PBMA), and mixtures thereof.

In one embodiment, the base polymer has a molecular weight ranging from 1000 to 100000.

BRIEF DESCRIPTION OF THE DRAWINGS

The invention will now be described by the following description taken with the accompanying drawings, in which.

DETAILED DESCRIPTION OF THE INVENTION

Figure 1:
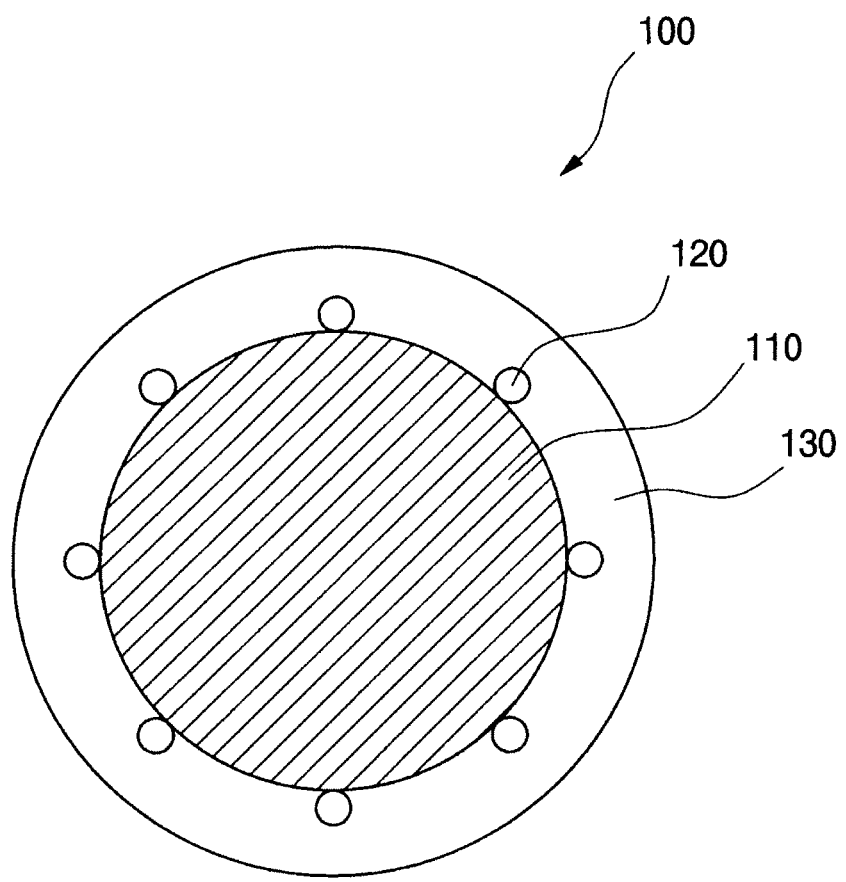
FIG. 1 is a schematic cross-sectional view of a negative electrode active material according to an exemplary embodiment of the present invention.

Referring to FIG. 1, a negative electrode active material 100 includes a graphite core particle 110 with metal particles 120 disposed on the surface of the graphite core particle, and a film 130 coating the graphite core particle 110 and the metal particles 120.

The graphite core particle 110 is a material capable of reversibly intercalating and deintercalating lithium ions. Nonlimiting examples of suitable graphite core particle materials include artificial graphite, natural graphite, graphitized carbon fibers, graphitized mesocarbon microbeads, and amorphous carbon.

In one embodiment, the graphite core particle has an average diameter ranging from 1 to 20 μm.

When the average diameter of the graphite core particle is less than 1 μm, it may be difficult to deposit metal particles on the surface of the graphite core particle. When the average diameter of the graphite core particle is more than 20 μm, it may be difficult to provide a uniformly coated film.

In one embodiment, the metal particles 120 are of a metal material capable of alloying with lithium. Nonlimiting examples of suitable metal materials include Al, Si, Sn, Pb, Zn, Bi, In, Mg, Ga, Cd, Ge, and combinations thereof. In one embodiment, Si is preferred because it has a high theoretical capacity (i.e. 4017 mAh/g).

The metal particles may have small diameters. In one embodiment, the metal particles have an average diameter ranging from 0.05 to 1 μm.

When the average diameter of the metal particles is less than 0.05 μm, the metal particles have large surface areas thereby inducing side reactions to occur, which can facilitate the decomposition of the electrolyte. When the average diameter of the metal particles is more than 1 μm, large volume expansion may occur, thereby decreasing the battery capacity characteristics.

When the metal composite negative electrode active material includes a metal material capable of alloying with lithium, the negative electrode active material may have increased capacity and energy density because the material can reversibly charge or discharge lithium ions similar to carbon materials. In one embodiment, the metal composite negative electrode active material can intercalate and deintercalate more lithium ions than conventional negative electrode active materials using carbon materials, thereby making production of high capacity batteries possible.

In one embodiment, the metal particles are present in an amount ranging from 3 to 10 wt % based on the total weight of the negative electrode active material. When the content of the metal particles is less than 3 wt %, the energy density may decrease. When the content of the metal particles is more than 10 wt %, the charge-discharge efficiency may decrease.

The film 130 serves as a reaction prevention layer to suppress reactions of the electrolyte with the graphite core particle 110 and its decomposition. The film 130 also helps to secure the metal particles 120 to the surface of the carbon particle. In this way, the metal particles 120 are not detached from the graphite core particle 110 to participate in the charge-discharge reaction.

The film 130 may be a polymer film. In one embodiment, the film is the polymerization product of a base polymer such as a polyimide- or polyacrylate-based polymer.

The polyacrylate-based polymer may be selected from the group consisting of poly methyl methacrylate (PMMA), poly ethyl methacrylate (PEMA), polybutyl methacrylate (PBMA), and mixtures thereof. In one embodiment, the base polymer may be dissolved in the electrolyte to facilitate crosslinking.

Conventional carbon films have been used for coating, but carbon films can be degraded when the metal particles expand during the charge-discharge cycle. The carbon films are therefore can be easily cracked causing the metal particles to be detached from the graphite core particle.

The detached metal particles may cause side reactions with the electrolyte, resulting in decreased charge-discharge cycle characteristics. Thus, in one embodiment, the carbon film is replaced with a polymer film, so that the metal particles are better secured to the graphite core particle.

Conventional carbon films are brittle and tend to crack when the metal particles expand. However, the polymer film of embodiments of the present invention is flexible and can conform to any curvature or shape to form a surface layer. Since the surface layer is a polymer film, compatibility and coupling efficiency with a binder are increased, and thus the charge-discharge cycle characteristic can further be improved.

In order to produce the polymer film, the base polymer may be dissolved in an appropriate solvent and subjected to a thermal treatment to obtain high cell performance. In one embodiment, the base polymer has a weight average molecular weight ranging from 1000 to 100,000. After going through the thermal treatment process, the weight average molecular weight of the base polymer increases due to a polymeric chain extension.

When the weight average molecular weight of the base polymer is less than 1000, the polymer film can be brittle. When the polymer's weight average molecular weight is greater than 100,000, the large molecular weight can adversely affect processability of the base polymer during the heat treatment step and other steps afterward.

A negative electrode having the above mentioned negative electrode active material and a lithium secondary battery according to the present invention will now be described.

In one embodiment, the negative electrode includes a negative electrode collector and a negative electrode active material made up of a plurality of the coated graphite core particles described above.

The negative electrode collector may be formed of copper or copper alloys. The collectors may be provided in different forms, such as foils, films, or sheets, or types such as punched, porous, or foamy type.

Figure 2:
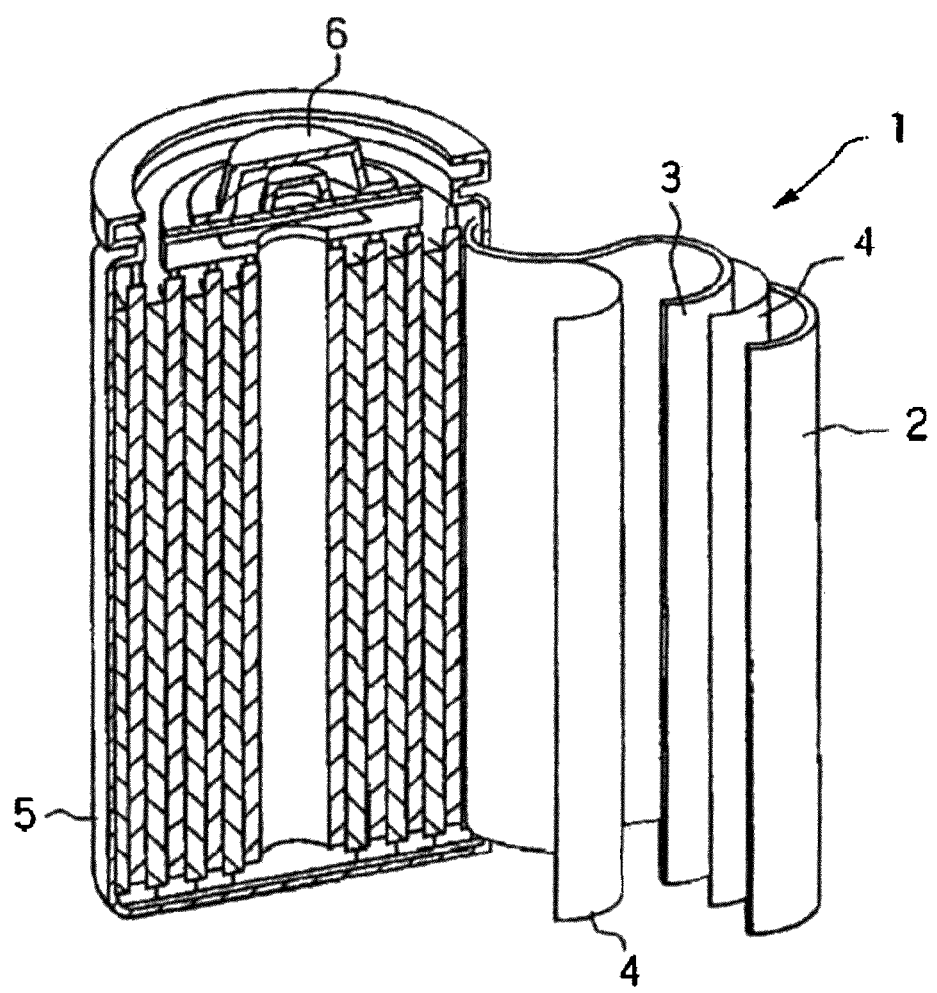
FIG. 2 is a partially cutaway perspective view of a battery according to an embodiment of the present invention.

Referring to FIG. 2, in one embodiment, a lithium secondary battery 1 is provided, which includes a positive electrode 3 and a negative electrode 2 with a separator 4 positioned between the two. The positive electrode 3 includes a positive electrode active material. The negative electrode 2 includes a negative electrode active material as described above. The positive electrode 3, the negative electrode 2, and the separator 4 are wound together to form an electrode assembly which is enclosed within a battery case along with an electrolyte, and sealed with a cap assembly 6.

The positive electrode includes a positive electrode active material capable of reversibly intercalating and deintercalating lithium ions. Nonlimiting examples of suitable positive electrode active materials include lithium-transition metal oxide, such as $LiCoO_2$, $LiNiO_2$, $LiMnO_2$, $LiMn_2O_4$, and $LiNi_{1-x-y}CO_xM_yO_2$ (where, $0 \leq x \leq 1$, $0 \leq y \leq 1$, $0 \leq x+y \leq 1$, M is Al, Sr, Mg or La).

In one embodiment, the positive electrode includes a positive electrode collector, which may be formed of aluminum or aluminum alloys. The positive collectors may be provided in different forms, such as foils, films, sheets, or types such as punched, porous, or foamy type.

In one embodiment, the separator is a polymeric resin layer. Nonlimiting examples of suitable polymeric resin layers include polyethylene and polypropylene layers. Other examples include, but are not limited to, porous layers formed by coupling a ceramic material with a binder.

In one embodiment, the electrolyte includes a non-aqueous organic solvent, which may be formed of carbonates, esters, ethers or ketones. Nonlimiting examples of suitable carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Nonlimiting examples of suitable esters include butyrolactone (BL), decanolide, valerolactone, mevalonolactone, caprolactone, n-methyl acetate, n-ethyl acetate, and n-propyl acetate. Nonlimiting examples of suitable ethers include dibutyl ether. Nonlimiting examples of suitable ketones include polymethylvinyl ketone. Although certain non-aqueous organic solvents are described, it is to be understood that the present invention is not restricted to the above described non-aqueous organic solvents.

In one embodiment, the non-aqueous organic solvent is a mixture of a cyclic carbonate and a chain carbonate. In one embodiment, the cyclic carbonate and the chain carbonate are present in a volume ratio ranging from 1:1 to 1:9, and preferably, from 1:1.5 to 1:4.

The electrolyte may further include an aromatic hydrocarbon organic solvent in addition to the carbonate solvent. Nonlimiting examples of suitable aromatic hydrocarbon organic solvents include benzene, fluorobenzene, chlorobenzene, nitrobenzene, toluene, fluorotoluene, trifluorotoluene, and xylene. In one embodiment, the electrolyte contains a mixture of a carbonate solvent and an aromatic hydrocarbon solvent present in a volume ratio ranging from 1:1 to 30:1.

In another embodiment, the electrolyte further includes a lithium salt, which drives the operation of the lithium battery by providing a source of lithium ions. Nonlimiting examples of suitable lithium salts include $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)_2$ (where, x and y are natural numbers), and $LiSO_3CF_3$.

In one embodiment, the lithium salt has a concentration ranging from 0.6 to 2.0 M. In another embodiment, the lithium salt has a concentration ranging from 0.7 to 1.6 M. When the concentration of the lithium salt is less than 0.6 M, both the electrolyte's conductivity and battery performance may decrease. When the concentration of the lithium salt is more than 2.0 M, the electrolyte's viscosity increases, thereby reducing the mobility of lithium ions.

The previously described positive and negative electrode active materials may be applied to a collector (which could be a thin film), to an appropriate thickness and length, wound or stacked together with a separator (which is an insulator) to form an electrode. The electrode then can be put into a can or a similar container with an electrolyte injected thereinto to provide a lithium secondary battery. The method of manufacturing a lithium secondary battery is well known to those of skill in the art and thus will not be described in detail.

The lithium secondary battery manufactured by the above method may be made in different shapes and sizes. Examples include, but are not limited cylindrical, rectangular, and pouch shapes.

Described below are certain exemplary embodiments of the present invention, including comparative examples.

Experimental Example 1

$LiCoO_2$, polyvinylidene fluoride (PVDF) as a binder, and carbon as a conductive material were mixed in a weight ratio of 92:4:4. The mixture was dispersed in N-methyl-2-pyrolidone as a solvent to form a positive electrode slurry. The slurry was coated on a 20 μm-thick aluminum foil, dried, and rolled to form a positive electrode.

A composite material of silicon and graphite was used as a negative electrode active material. In the exemplary embodiment, graphite was used as a core particle, and silicon was used as a metal particle. The graphite core particles and the silicon particles were coated with a film formed from a polyimide polymer. The coated product was then mixed with styrene-butadiene rubber as a binder and carboxymethyl cellulose as a thickener, at a weight ratio of 96:2:2. The mixture was then dispersed in water to form a negative electrode active material slurry. The slurry was coated on a 15 μm-thick copper foil, dried, and rolled to form a negative electrode.

A 20 μm-thick separator film comprising polyethylene (PE) was inserted between the electrodes, wound, compressed, and inserted into a cylindrical can. An electrolyte was injected into the cylindrical can to form a lithium secondary battery.

Comparative Example 1

Comparative Example 1 was prepared in the same way as Experimental example 1, except that the graphite core particles and the silicon particles were coated with a carbon material instead of a film formed from a polyimide polymer.

The lithium batteries of Experimental example 1 and Comparative example 1 were charged to a cut-off voltage of 4.2V at a charge-discharge rate of 0.8 C, and then discharged to a cut-off voltage of 3.0V at a charge-discharge rate of 1 C. The charge and discharge cycle was repeated for 100 times. At the $100^{th}$ cycle, the battery capacity (%) was measured and the capacity maintenance rate at the $100^{th}$ cycle was calculated.

High rate discharge capacities (2 C discharge charge capacity/0.2 C charge capacity cycle was repeated for 100 times) of the lithium batteries in Experimental example 1 and Comparative example 1 were also measured.

The measurements are listed in Table 1.

TABLE 1

|  | Material (Kind) of Film | $100^{th}$ cycle capacity (%) | High rate discharge capacity (%) |
| --- | --- | --- | --- |
| E. example 1 | Polyimide | 53 | 90 |
| C. example 1 | Carbon material | 29.5 | 87.4 |

The results of Table 1 demonstrate that batteries with a polyimide film instead of a carbon material film have better performance. In particular, the $100^{th}$ cycle capacity was significantly higher, and the high rate discharge capacity was also increased. In other words, when the film was formed of a polymer, the charge-discharge cycle characteristics of the batteries improved.

It is believed that the negative electrode active materials of the embodiments of the present invention suppress side reactions with the electrolyte. Hence, the cycle life and high rate discharge characteristics of the secondary battery improve.

While the present invention has been described with reference to certain exemplary embodiments, it is to be understood by those skilled in the art that various changes in forms and compositions may be made to those embodiments without departing from the principles and spirit of the invention, the scope of which is also defined by the following claims.

What is claimed is:

1. A negative electrode active material for forming a negative electrode active material layer on a negative electrode collector, comprising:
  a graphite core particle;
  at least one metal particle on the graphite core particle; and
  a polymer film substantially encapsulating the graphite core particle and the at least one metal particle, the polymer film configured to secure the at least one metal particle to a surface of the graphite core particle,
  wherein the polymer film comprises a polymerization reaction product of a polyimide- or polyacrylate-based base polymer.

2. The negative electrode active material of claim 1, wherein the polyacrylate-based base polymer is selected from the group consisting of polymethylmethacrylate (PMMA), polyethylmethacrylate (PEMA), polybutyl methacrylate (PBMA), and mixtures thereof.

3. The negative electrode active material of claim 1, wherein the polymer film comprises a polymerization reaction product of the base polymer having a weight average molecular weight ranging from 1000 to 100000.

4. The negative electrode active material of claim 1, wherein the graphite core particle is selected from the group consisting of synthetic graphite, natural graphite, graphitized carbon fibers, graphitized mesocarbon microbeads, amorphous carbon, and combinations thereof.

5. The negative electrode active material of claim 1, wherein the metal particle comprises a material selected from the group consisting of Al, Si, Sn, Pb, Zn, Bi, In, Mg, Ga, Cd, Ge, and mixtures thereof.

6. A negative electrode, comprising:
a negative electrode collector; and
a negative electrode active material layer disposed on the negative electrode collector, the negative electrode active material layer comprising a negative electrode active material, a binder and a thickener, wherein the negative electrode active material comprises a plurality of graphite core particles, each graphite core particle comprises at least one metal particle in contact with a surface of the graphite core particle, and a polymer film coating the graphite core particle and the at least one metal particle, wherein the polymer film is configured to secure the at least one metal particle to the surface of the graphite core particle, the polymer film comprises a polymerization reaction product of a polyimide- or polyacrylate-based base polymer.

7. The negative electrode of claim 6, wherein the polyacrylate-based base polymer is selected from the group consisting of PMMA, PEMA, PBMA, and mixtures thereof.

8. The negative electrode of claim 6, wherein the polymer film comprises a polymerization reaction product of the base polymer having a weight average molecular weight ranging from 1000 to 100000.

9. The negative electrode of claim 6, wherein the graphite core particle is selected from the group consisting of synthetic graphite, natural graphite, graphitized carbon fibers, graphitized mesocarbon microbeads, amorphous carbon, and combinations thereof.

10. The negative electrode of claim 6, wherein the metal particle is selected from the group consisting of Al, Si, Sn, Pb, Zn, Bi, In, Mg, Ga, Cd, Ge, and mixtures thereof.

11. A lithium secondary battery, comprising:
a positive electrode having a positive electrode active material;
a negative electrode having a negative electrode active material, a binder and a thickener, the negative electrode active material comprising a plurality of graphite core particles, each graphite core particle comprising at least one metal particle on the graphite core particle, and a polymer film substantially encapsulating the graphite core particle and the at least one metal particle, the polymer film comprising a polymerization reaction product of a polyimide- or polyacrylate-based base polymer, the polymer film being configured to secure the at least one metal particle to a surface of the graphite core particle;
a separator separating the positive electrode from the negative electrode; and
an electrolyte.

12. The lithium secondary battery of claim 11, wherein the polyacrylate-based base polymer is selected from the group consisting of PMMA, PEMA, PBMA, and mixtures thereof.

13. The lithium secondary battery of claim 11, wherein the polymer film comprises a polymerization reaction product of the base polymer having a weight average molecular weight ranging from 1000 to 100000.

14. The lithium secondary battery of claim 11, wherein the graphite core particles are selected from the group consisting of synthetic graphite, natural graphite, graphitized carbon fibers, graphitized mesocarbon microbeads, amorphous carbon, and combinations thereof.

15. The lithium secondary battery of claim 11, wherein the metal particle is selected from the group consisting of Al, Si, Sn, Pb, Zn, Bi, In, Mg, Ga, Cd, Ge, and mixtures thereof.

16. The lithium secondary battery of claim 11, wherein the electrolyte comprises a non-aqueous organic solvent and a lithium salt.

17. The negative electrode active material of claim 1, wherein the metal particle is present in a range of 3 wt % to 10 wt % based on the total weight of the negative electrode active material.

* * * * *